(12) United States Patent
Eppinger et al.

(10) Patent No.: US 11,730,093 B2
(45) Date of Patent: *Aug. 22, 2023

(54) METHOD FOR ASSISTING DURING EXECUTION OF A SEQUENCE OF CUTTINGS IN A TREE, AND SYSTEM FOR ASSISTING DURING EXECUTION OF A SEQUENCE OF CUTTINGS IN A TREE

(71) Applicant: Andreas Stihl AG & Co. KG, Waiblingen (DE)

(72) Inventors: Andreas Eppinger, Stuttgart (DE); Florian Eppinger, Bochum (DE); Benjamin Frey, Berglen (DE); Friedrich Hollmeier, Rudersberg (DE); Dirk Jaeger, Hatzfeld (DE); Antonio Kraemer Fernandez, Stuttgart (DE); Steffen Kugel, Fellbach (DE); Harald Mang, Winnenden (DE); Bettina Maier, Tuebingen (DE); Michael Reinert, Rudersberg (DE); Steffen Suepple, Stuttgart (DE); Martin Tippelt, Waldenbuch (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 85 days.

This patent is subject to a terminal disclaimer.

(21) Appl. No.: 17/133,913

(22) Filed: Dec. 24, 2020

(65) Prior Publication Data

US 2021/0137030 A1 May 13, 2021

Related U.S. Application Data

(63) Continuation of application No. 16/026,798, filed on Jul. 3, 2018, now Pat. No. 10,905,053.

(30) Foreign Application Priority Data

Jul. 4, 2017 (EP) .................... 17179678

(51) Int. Cl.
*A01G 23/00* (2006.01)
*A01G 23/099* (2006.01)
(Continued)

(52) U.S. Cl.
CPC ............. *A01G 23/00* (2013.01); *A01G 23/08* (2013.01); *A01G 23/099* (2013.01); *A01G 3/086* (2013.01);
(Continued)

(58) Field of Classification Search
CPC ...... A01G 23/00; A01G 23/003; A01G 23/02; A01G 23/08; A01G 23/091
See application file for complete search history.

(56) References Cited

U.S. PATENT DOCUMENTS 9,198,363 B2 * 12/2015 Vian ...................... G01S 7/4802
10,098,290 B2 * 10/2018 Hunt .................... A01G 23/091
(Continued)

FOREIGN PATENT DOCUMENTS

CN 105026122 A 11/2015
CN 205431331 U 8/2016
(Continued)

OTHER PUBLICATIONS

German-language Office Action issued in German Application No. 17179678.2 dated Jun. 5, 2020 (seven (7) pages).
(Continued)

*Primary Examiner* — Matthew Katcoff
(74) *Attorney, Agent, or Firm* — Crowell & Moring LLP

(57) ABSTRACT

A system assists during execution of a sequence of cuttings in a tree, wherein, during a cutting sequence, a first cut in the
(Continued)

tree is followed by a second cut in the tree At least a part of an ideal course of the second cut depends on at least a part of a course of the first cut. An identification device identifies at least the part of the course of the first cut in the tree. A precalculation device precalculates at least the part of the ideal course of the second cut in the tree based on the identified part of the course of the first cut. An output device outputs cutting information for executing the second cut based on the precalculated part of the ideal course of the second cut.

14 Claims, 2 Drawing Sheets

(51) Int. Cl.
  *A01G 23/08* (2006.01)
  *B27B 1/00* (2006.01)
  *B27B 17/02* (2006.01)
  *A01G 3/08* (2006.01)
  *B23D 59/00* (2006.01)
(52) U.S. Cl.
  CPC .......... *B23D 59/002* (2013.01); *B23D 59/008* (2013.01); *B27B 1/007* (2013.01); *B27B 17/02* (2013.01)

(56) References Cited

U.S. PATENT DOCUMENTS

| | | | |
|---|---|---|---|
| 11,102,940 B2* | 8/2021 | Lennings | ............... G06Q 50/02 |
| 2015/0360305 A1 | 12/2015 | Willgert | |
| 2016/0057946 A1 | 3/2016 | Kaye et al. | |
| 2019/0061028 A1 | 2/2019 | Martinsson | |

FOREIGN PATENT DOCUMENTS

| | | |
|---|---|---|
| DE | 20 2004 002 210 U1 | 12/2004 |
| DE | 10 2004 002 747 A1 | 8/2005 |
| DE | 10 2008 027 185 A1 | 12/2009 |
| DE | 10 2009 019 980 A1 | 11/2010 |
| DE | 10 2009 040 436 A1 | 3/2011 |
| DE | 10 2011 100 016 A1 | 10/2012 |
| DE | 10 2014 206 289 A1 | 10/2015 |
| EP | 2 990 169 A1 | 3/2016 |
| WO | WO 2014/120898 A1 | 8/2014 |

OTHER PUBLICATIONS

Competenz, Best practice guidelines for Tree Felling, Jan. 2005, pp. 9-12 and 30-31 (Year: 2005).
University of Alaska Fairbanks, Howto Cut Down a Tree, Jun. 2016, pp. 8-10 (Year: 2016).
Chinese-language Office Action issued in Chinese Application No. 201810723123.6 dated May 8, 2021 (nine (9) pages).

* cited by examiner

METHOD FOR ASSISTING DURING EXECUTION OF A SEQUENCE OF CUTTINGS IN A TREE, AND SYSTEM FOR ASSISTING DURING EXECUTION OF A SEQUENCE OF CUTTINGS IN A TREE

REFERENCE TO RELATED APPLICATION

This application is a continuation of U.S. patent application Ser. No. 16/026,798, filed Jul. 3, 2018, which claims priority under 35 U.S.C. § 119 from European Patent Application No. 17179678.2, filed Jul. 4, 2017, the entire disclosure of which is herein expressly incorporated by reference.

BACKGROUND AND SUMMARY OF THE INVENTION

The invention relates to a method for assisting during execution of a sequence of cuttings in a tree, and to a system for assisting during execution of a sequence of cuttings in a tree.

The invention is based on the problem of providing a method for assisting during execution of a sequence of cuttings in a tree and a system for assisting during execution of a sequence of cuttings in a tree, which method and system each improve safety during execution of the sequence of cuttings and/or make it easier to prevent undesired damage, in particular to the tree.

The invention solves this problem by providing a method and a system for assisting during execution of a sequence of cuttings in a tree in accordance with claimed embodiments of the invention. Advantageous developments and/or configurations of the invention are described and claimed herein.

The, in particular automatic, method according to the invention for assisting or supporting during execution of a sequence of cuttings in a tree, wherein, during the cutting sequence, a first cut in the tree is followed by a second cut in the tree, wherein at least a part of an ideal course of the second cut depends on at least a part of a course of the first cut, comprises the steps: a) identifying, in particular automatically identifying, at least the part of the course of the first cut, in particular during and/or after execution of the first cut; b) precalculating, in particular automatically precalculating, at least the part of the ideal course of the second cut in the tree based on the identified part of the course of the first cut; and c) outputting, in particular automatically outputting, cutting information for executing the second cut based on the precalculated part of the ideal course of the second cut.

The method allows safety to be improved during execution of the sequence of cuttings, in particular for a forestry worker executing the sequence of cuttings. In addition or as an alternative, the method allows it to be made easier to prevent undesired damage, in particular to the tree. Therefore, a maximum economic profit can be made from the tree.

In particular, the sequence of cuttings can be made in a trunk of the tree and/or in one or more branches of the tree. In particular, the sequence of cuttings can lead to severing of the tree, in particular its trunk and/or its branches. The trunk can be standing, in particular living, or felled, in particular horizontal. The one or more branches can be disposed on the trunk.

A deviation from the at least one part of the ideal course of the second cut during execution of the second cut can lead to the tree, in particular its trunk and/or its branch, responding differently than the manner desired. In particular, the deviation can be caused in that the at least one part of the ideal course can be difficult to realize or even may be unknown. By way of example, the tree can then fall and/or become trapped on something in an undesired manner in this case. Furthermore, a tension on the tree can be released and the tree can deflect, and in the process, injure, in particular, the forestry worker. In addition, the tree, in particular its trunk, can rip and/or split. This may reduce an economic profit which can be made from the tree. By virtue of outputting the cutting information, a risk of these disadvantages occurring can be reduced or even avoided.

The at least one part of the ideal course of the second cut can depend on the at least one part of the course of the first cut in that the second cut should at least partially be in a relative position and/or include a relative orientation in relation to the first cut or its part. In particular, the ideal, in particular complete, course of the second cut can be dependent on the, in particular complete, course of the first cut.

The part of the course can be, in particular, a start or an end, in particular an end line, of the course.

The second cut or its course can be different from the first cut or its course.

The step b) can be executed at the same time as step a) and/or after the said step a). The step c) can be executed at the same time as step b) and/or after the said step b).

In one development of the invention, the step a) includes: identifying the part of the course of the first cut and/or identifying a position and/or an orientation or an alignment of a cutting apparatus executing the first cut, in particular during the execution, using optical identification, in particular in combination with photogrammetry, and/or using inertial measurement and/or using a spirit level and/or using a compass and/or using local position determination and/or using satellite position determination. In particular, the part of the course of the first cut can be described by position coordinates and/or orientation angles. This can also apply to the at least one part of the course of the second cut. The position coordinates and/or the orientation angles can be identified by in each case at least one of the said techniques. The at least one part of the course can be obtained, in particular identified, based on the detected position and/or the detected orientation of the cutting apparatus. In particular, a physical expansion or extension of the cutting apparatus can be taken into account. In particular, optical identification can be performed from different identification positions and/or with depth information.

In one development of the invention, the first cut and/or the second cut are/is selected from a group consisting of: a kerf lower cut, a kerf upper cut, a felling cut, a relief cut and a separation cut. The kerf lower cut, the kerf upper cut and the felling cut can facilitate felling of the tree. The relief cut and the separation cut can facilitate severing of the tree or its trunk which can be under tension. The kerf lower cut can or should run horizontally in the tree or in its trunk. The kerf lower cut can or should be one fifth to one third of a diameter of the trunk. The kerf upper cut can run at an angle of at least 45 degrees in relation to the horizontal into the tree or into its trunk from above. The kerf upper cut can or should be one fifth to one third of a diameter of the trunk. One of the kerf cuts can run into the tree from below. In this case, it can be called a Humboldt cut. The tensioned tree or its trunk can have a pressure side and a tension side. The relief cut can lead into the tree on the pressure side. The separation cut can lead into the tree on the tension side. In addition, the group can consist of: a splint cut, a kerf birdmouth cut, a retaining strap cut and/or a safety strap cut.

In one refinement of the invention, the step b) includes: precalculating at least the part of the ideal course of the second cut such that the kerf upper cut as the second cut meets the kerf lower cut as the first cut in a kerf chord and/or that the kerf lower cut as the second cut meets the kerf upper cut as the first cut in the kerf chord and/or that the felling cut as the second cut has a horizontal offset and a vertical offset in relation to the kerf lower cut or the kerf upper cut as the first cut and/or that the separation cut as the second cut meets the relief cut as the first cut. The kerf lower cut or its course and the kerf upper cut or its course should meet exactly at the kerf chord and neither of the two cuts or courses should go beyond the other. The kerf lower cut and the kerf upper cut can then form a curve or a felling wedge, in particular for safely felling the tree. The kerf can generally determine a falling direction of the tree and can be used to enable tipping of the tree in a desired direction. In addition, the kerf upper cut or its course can or should at least be at an angle of 45 degrees in relation to the kerf lower cut or its course in order to create a sufficiently large opening in this way. In this way, it is possible to ensure that, during felling, the tree cannot sit with the kerf roof on the kerf base and the trunk cannot rip along the longitudinal axis in this sitting position. The felling cut can or should be started or made one tenth of the diameter of the trunk, but at least 3 centimetres (cm), laterally next to the kerf lower cut, in particular its end line or the kerf chord. This horizontal offset can be called the hinge width. Furthermore, the felling cut can or should be started one tenth of the diameter of the trunk, but at least 3 cm, above the kerf lower cut, in particular its end line or the kerf chord. This vertical offset can be called the hinge step. An end line of the felling cut, which can be called the hinge chord, can or should run parallel to the kerf chord. The hinge width and hinge step can form a hinge which can hold the tree during felling work and safely guide the said tree during felling. Steep cutting of the hinge width and/or the hinge step can lead to a deviation from the intended falling direction. Furthermore, the felling cut can or should run horizontally in the tree or in its trunk and/or parallel to the kerf lower cut.

In one development of the invention, the method comprises the step: providing, in particular identifying, a geometric property of the tree. The step b) comprises: precalculating at least the part of the ideal course of the second cut as a function of the provided geometric property. In particular, the geometric property of the tree can include or be the diameter of the trunk, if present. The geometric property can be identified, in particular, by in each case at least one of the above-described techniques for identifying the at least one part of the course of the first cut.

In one development of the invention, the cutting information for executing the second cut includes: the at least one part of the ideal course of the second cut and/or an ideal position and/or an ideal orientation of a cutting apparatus executing the second cut based on the at least one precalculated part of the ideal course. In particular, the cutting information can include where and/or how execution of the second cut can or should be started and/or terminated on the tree. The ideal position can be a starting position or an end position. The ideal orientation can be a starting orientation or an end orientation. In particular, the ideal position and/or the ideal orientation can be precalculated based on the at least one precalculated part of the ideal course, in particular at the same time as step b) and/or after the said step b) and/or before step c) or at the same time as the said step c).

In one development of the invention, the cutting information is output using optics, acoustics and/or haptics in step c). This can provide the forestry worker with a relatively good perception of the cutting information. In particular, the output by optics can include a display. The output by optics can include superimposition or projection of the cutting information into a field of view of the forestry worker. The output by optics can include projection of the cutting information onto the tree. The output by haptics can include vibration.

In one development of the invention, the method comprises the steps: d) identifying, in particular automatically identifying, at least a part of a course of the second cut during execution thereof and/or identifying a position and/or an orientation of a cutting apparatus executing the second cut during execution thereof. e) comparing, in particular automatically comparing, the identified part to the precalculated part of the ideal course of the second cut and/or comparing the identified position and/or the identified orientation of the cutting apparatus to an ideal position and/or an ideal orientation of the cutting apparatus based on the precalculated part of the ideal course, in particular during step d). f) outputting, in particular automatically outputting, further cutting information for executing the second cut based on the comparison during step d). This can allow a deviation from the at least one part of the ideal course of the second cut to be avoided during execution of the second cut or to return to the ideal course again in the event of a deviation. The further cutting information can include an instruction to return, in particular a position instruction and/or an orientation instruction. In addition or as an alternative, the further cutting information can include an instruction to terminate the execution of the second step. The further cutting information can be output in the same way as the cutting information.

Furthermore, the invention relates to a system for assisting during execution of the sequence of cuttings in the tree, wherein, during the cutting sequence, the first cut in the tree is followed by the second cut in the tree, wherein the at least one part of the ideal course of the second cut depends on the at least one part of the course of the first cut. The system can be configured, in particular, for executing the above-described method. The system according to the invention includes an identification device, a precalculation device and an output device. The identification device is configured to identify at least the part of the course of the first cut in the tree. The precalculation device is configured to precalculate at least the part of the ideal course of the second cut in the tree based on the identified part of the course of the first cut. The output device is configured to output the cutting information for executing the second cut based on the precalculated part of the ideal course of the second cut.

The system can allow the same advantages as the above-described method.

In particular, the precalculation device can include or be a processor, in particular a CPU.

In one development of the invention, the system includes the cutting apparatus configured to execute the first cut and/or the second cut. In particular, the cutting apparatus can be configured as a hand-held cutting apparatus. Hand-held cutting apparatus can mean that the cutting apparatus can have a maximum mass of 50 kilograms (kg), in particular of 20 kg, in particular of 10 kg. The identification device and/or the output device can be disposed on the cutting apparatus.

In one development of the invention, the cutting apparatus includes a saw or is a saw. In particular, the saw can include or be a motorized saw and/or a chainsaw.

In one development of the invention, the identification device includes a camera, an inertial measuring unit, the spirit level, the compass, a local position determination device, and/or a satellite position determination device. The camera can include a stereo camera and/or a TOF camera for depth information. TOF cameras are 3D camera systems which can measure distances using the time of flight method. The inertial measuring unit can include at least one acceleration sensor and/or at least one rate of rotation sensor. The spirit level can be configured as an electrical or digital spirit level. The compass can be configured as an electrical or digital compass. The local position determination device can advantageously be based on one or more different technologies, such as distance measurements from node points, optical signals, radio waves, magnetic fields, acoustic signals, ultra-wideband, Bluetooth, WLAN, ultrasound and/or RFID. The satellite position determination device can be configured for one or more satellite position determination systems such as NAVSTAR GPS, GLONASS, Galileo and/or BeiDou. In addition or as an alternative, the satellite position determination device can be configured as an RTK (real time kinematic) satellite position determination device and/or as a differential satellite position determination device.

In one development of the invention, the output device includes a display, a sound generator and/or a vibration device or is one of the above. In particular, the display can be configured to display the cutting information in the field of view of the forestry worker, in particular in front of the tree, and/or to project or superimpose the said cutting information into the said field of view, in particular before and/or during execution of the second cut by the forestry worker. The display can be called a head-up display. This can be called virtual reality and/or augmented reality.

In one development of the invention, the system includes a protective helmet, a face shield and/or ear protection, safety goggles, a protective glove, a smartwatch, an armband or a wristband or a bracelet, whereon the output device is disposed. This allows the output device to be worn on the body of the forestry worker. In particular, the display, if present, can be configured to display the cutting information on or project the said cutting information into a visor of the protective helmet, of the face shield and/or ear protection and/or of the safety goggles, if present. The display can be called a head-mounted display. The identification device can be arranged on the protective helmet, the face shield and/or ear protection, the safety goggles, the protective glove, the smartwatch, the armband or wristband or the bracelet, if present.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
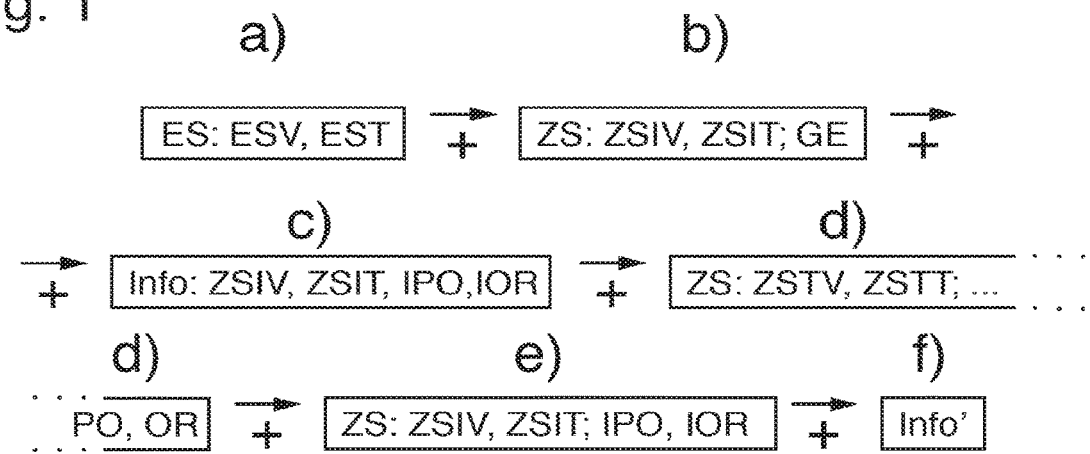
FIG. 1 is a flowchart of an exemplary method according to the invention.

FIG. 1 shows a method for assisting during execution of a sequence of cuttings in a tree 100, wherein, during the cutting sequence, a first cut ES in the tree 100 is followed by a second cut ZS in the tree 100, wherein at least a part ZSIT of an ideal course ZSIV of the second cut ZS depends on at least a part EST of a course ESV of the first cut ES. The method comprises the steps: a) identifying the at least one part EST of the course ESV of the first cut ES in the tree 100; b) precalculating the at least one part ZSIT of the ideal course ZSIV of the second cut ZS in the tree 100 based on the identified part EST of the course ESV of the first cut ES; and c) outputting cutting information Info for executing the second cut ZS based on the precalculated part ZSIT of the ideal course ZSIV of the second cut ZS.

Figure 2:
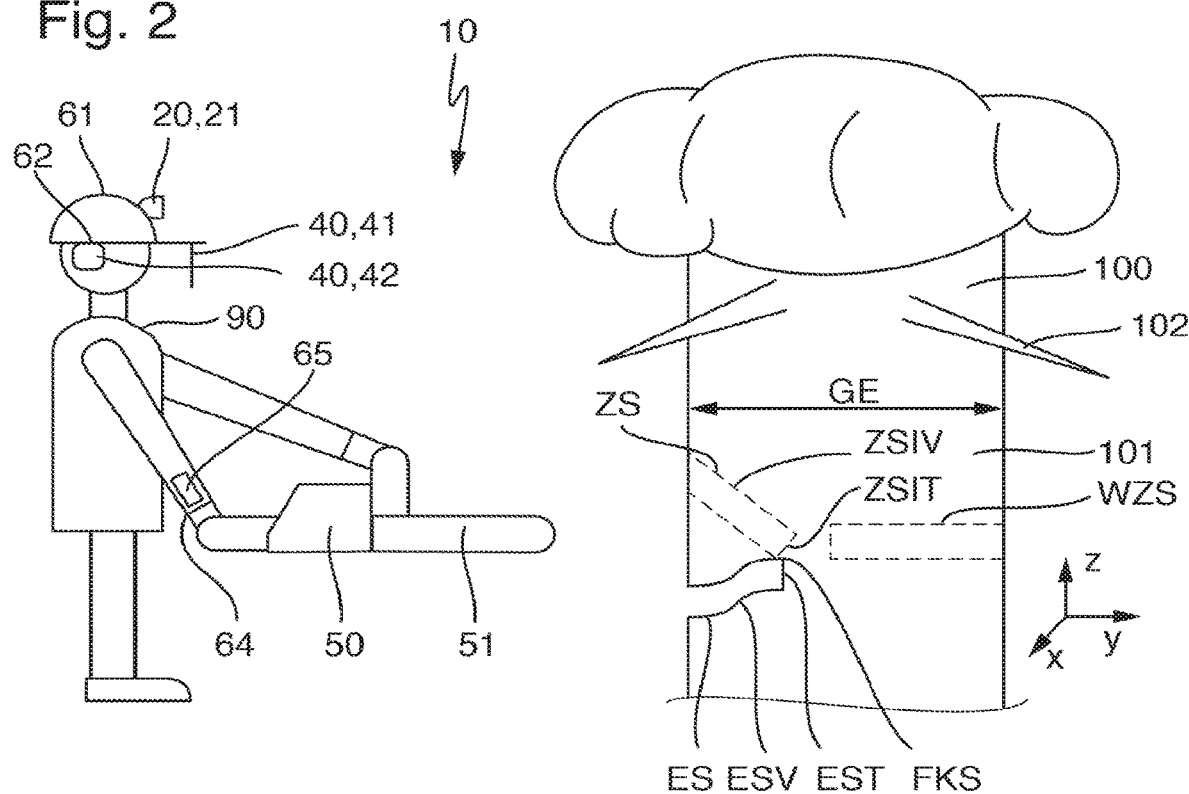
FIG. 2 is a perspective view of a system according to an embodiment of the invention comprising a cutting apparatus during execution of a sequence of cuttings in a tree after a first cut and before a second cut.
Figure 3:
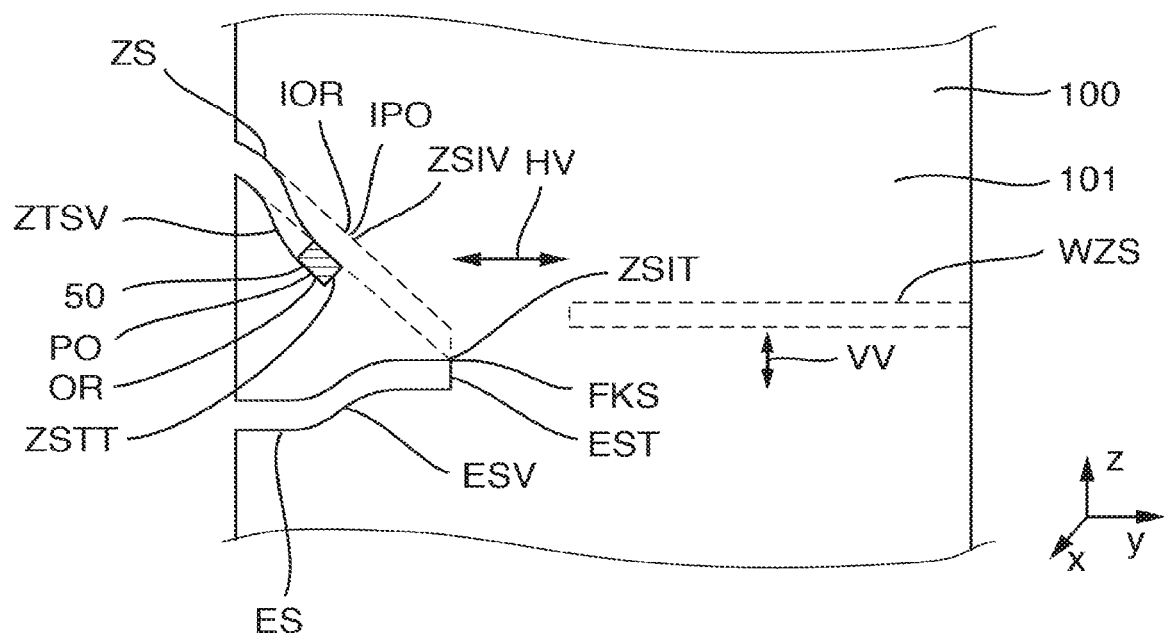
FIG. 3 is a further perspective view of the system of FIG. 2 during execution of the sequence of cuttings in the tree during the second cut.
Figure 4:
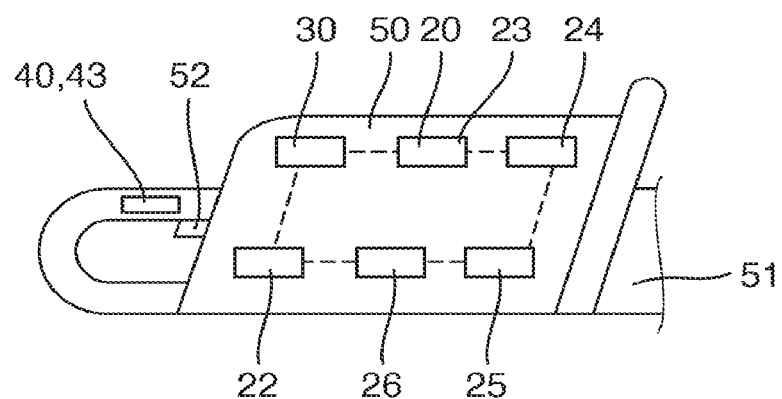
FIG. 4 is a view of a longitudinal section of the cutting apparatus of FIG. 2.

FIGS. 2 to 4 show a system 10 for assisting during execution of the sequence of cuttings in the tree 100, wherein, during the cutting sequence, the first cut ES in the tree 100 is followed by the second cut ZS in the tree 100, wherein at least a part ZSIT of the ideal course ZSIV of the second cut ZS depends on at least the part EST of the course ESV of the first cut ES. The system 10 is configured, in particular, for executing the above-described method. The system 10 has an identification device 20, a precalculation device 30 and an output device 40. The identification device 20 is configured to identify the at least one part EST of the course ESV of the first cut ES in the tree 100. The precalculation device 30 is configured to precalculate the at least one part ZSIT of the ideal course ZSIV of the second cut ZS in the tree 100 based on the identified part EST of the course ESV of the first cut ES. The output device 40 is configured to output the cutting information Info for executing the second cut ZS based on the precalculated part ZSIT of the ideal course ZSIV of the second cut ZS.

Furthermore, the system 10 includes a cutting apparatus 50. The cutting apparatus 50 is configured to execute the first cut ES and the second cut ZS. Specifically, the cutting device 50 includes a saw 51, in particular a motor-driven chainsaw.

In addition, the identification device 20 includes a camera 21, an inertial measuring unit 22, a spirit level 23, a compass 24, a local position determination device 25 and a satellite position determination device 26. In alternative exemplary embodiments, it can be sufficient when the identification device can include either the camera or the inertial measuring unit or the spirit level or the compass or the local position determination device or the satellite position determination device.

The system 10 further has a protective helmet 61, a face shield and/or ear protection 62, a protective glove 64 and a smartwatch 65. In the exemplary embodiment shown, the camera 21 is disposed on the protective helmet 61, as can be seen in FIG. 2. In alternative exemplary embodiments, the identification device can, in addition or as an alternative, be disposed on the face shield and/or ear protection, the protective glove and/or the smartwatch. In alternative exemplary embodiments, the system can further include safety goggles, an armband or a wristband or a bracelet, whereon the identification device can be disposed.

In the exemplary embodiment shown, the inertial measuring unit 22, the spirit level 23, the compass 24, the local position determination device 25 and the satellite position determination device 26 are additionally disposed on the cutting apparatus 50 or in the cutting apparatus 50, as can be seen in FIG. 4.

Accordingly, the step a) includes: identifying the at least one part EST of the course ESV of the first cut ES and identifying a position PO and an orientation OR of the cutting apparatus 50 executing the first cut ES using optical identification, in particular using the camera 21, using inertial measurement, in particular using the inertial measuring unit 22, using the spirit level 23, using the compass 24, using local position determination, in particular using the local position determination device 25, and using satellite position determination, in particular using the satellite position determination device 26. In alternative exemplary embodiments, it can be sufficient when the step a) can include: either identifying the part of the course of the first cut or identifying the position and/or the orientation of the cutting apparatus executing the first cut. In alternative exemplary embodiments, it can further be sufficient when the step a) can include: identification either using optical identification or using inertial measurement or using the spirit level or using the compass or using local position determination or using satellite position determination.

In the exemplary embodiment shown, a forestry worker 90 wears the protective helmet 61 and carries the cutting apparatus 50, as can be seen in FIG. 2. The forestry worker 90 can walk around the tree 100. In the process, the course ESV of the first cut ES can be optically identified from various identification positions using the camera 21.

Furthermore, a physical expansion or a physical extension of the cutting apparatus 50, in particular an expansion of a guide rail or a chain bar of the saw 51, is taken into account during identification of the position PO and the orientation OR of the cutting apparatus 50 executing the first cut using the inertial measuring unit 22, the spirit level 23, the compass 24, the local position determination device 25 and/or the satellite position determination device 26.

In addition, the cutting apparatus 50 has an operating button 52 in the form of a throttle lever. Execution of the first cut ES using the cutting apparatus 50 can be identified using identification of operation of the operating button 52.

The method further includes the step: providing a geometric property GE of the tree 100. The step b) includes: precalculating at least one part ZSIT of the ideal course ZSIV of the second cut ZS as a function of the provided geometric property GE.

In the exemplary embodiment shown, the geometric property GE includes a diameter of the tree 100 or its trunk 101. The geometric property GE is identified using the camera 21. A position and an orientation of the tree 100 are additionally identified using the camera 21, in particular while the said forestry worker is walking around the tree.

In addition, the precalculation device 30 is disposed on the or in the cutting apparatus 50.

Furthermore, the output device 40 includes a display 41, a sound generator 42 and a vibration device 43. In alternative exemplary embodiments, it may be sufficient when the output device can include either the display or the sound generator or the vibration device.

In the exemplary embodiment shown, the display 41 is disposed on the protective helmet 61. Specifically, the protective helmet 61 includes a visor. The display 41 is configured to display the cutting information Info on the visor of the protective helmet 61 in a field of view of the forestry worker 90, in particular in front of the tree 100, and/or to project the said cutting information into the field of view in front of the tree 100. In alternative exemplary embodiments, the display can be disposed elsewhere.

In addition, in the exemplary embodiment shown, the sound generator 42 is disposed on the face shield and/or ear protection 62. In alternative exemplary embodiments, the sound generator can be disposed elsewhere.

In the exemplary embodiment shown, the vibration device 43 is further disposed on the cutting apparatus 50. In alternative exemplary embodiments, the vibration device can be disposed elsewhere.

Accordingly, the cutting information Info is output using optics, acoustics and haptics in step c). In alternative exemplary embodiments, it can be sufficient when the cutting information can be output using either optics or acoustics or haptics.

In the exemplary embodiment of FIGS. 2 and 3, the first, in particular executed, cut ES is a kerf lower cut in the tree 100 or in its trunk 101. The second cut ZS is a kerf upper cut. A further second cut WZS is a felling cut. The kerf lower cut ES, the kerf upper cut ZS and the felling cut WZS can allow felling of the, in particular standing, tree 100.

The step b) includes: precalculating at least the part ZSIT of the ideal course ZSIV of the second cut ZS such that the kerf upper cut as the second cut ZS meets the kerf lower cut as the first cut ES in a kerf chord FKS. The step b) additionally includes: precalculating at least the part of the ideal course of the further second cut WZS such that the felling cut as the further second cut WZS has a horizontal offset HV and a vertical offset VV in relation to the kerf lower cut or the kerf upper cut as the first cut ES or second cut ZS.

In alternative exemplary embodiments, the kerf upper cut can be the first cut and the kerf lower cut can be the second cut. The step b) can include: precalculating at least the part of the ideal course of the second cut such that the kerf lower cut as the second cut can meet the kerf upper cut as the first cut in the kerf chord.

In the exemplary embodiment shown in FIGS. 2 and 3, the forestry worker 90 has planned to cut the kerf lower cut horizontally in the tree. However, the kerf lower cut ES actually runs slightly upwards in a central part. The kerf upper cut should run at an angle of at least 45 degrees in relation to the horizontal or in relation to the kerf lower cut in order to in this way obtain a sufficiently large opening by virtue of a formed kerf in the tree. In this way, it is possible to ensure that, during felling, the tree cannot sit with a kerf roof on a kerf base and the trunk cannot rip along the longitudinal axis as a result.

On account of the, in particular actual, course ESV of the kerf lower cut as the first cut ES, the ideal course ZSIV of the kerf upper cut as the second cut ZS in FIGS. 2 and 3 should start relatively higher up the tree 100 or its trunk 101 than originally planned by the forestry worker 90. In this way, the kerf lower cut as the first cut ES or its course ESV and the kerf upper cut as the second cut ZS or its ideal course ZSIV can meet exactly at the kerf chord FKS. The kerf lower cut and the kerf upper cut can then form an ideal kerf, in particular for safely felling the tree 100.

The felling cut WZS can or should be started one tenth of the diameter GE of the trunk 101, but at least 3 cm, laterally next to the kerf lower cut as the first cut ES or its course ESV or the kerf chord FKS. This horizontal offset HV can be called the hinge width. Furthermore, the felling cut as the further second cut WZS can or should be started one tenth of the diameter GE of the trunk 101, but at least 3 cm, above the kerf lower cut as the first cut ES or its course ESV or the kerf chord FKS. This vertical offset VV can be called the hinge step.

On account of the, in particular actual, course ESV of the kerf lower cut as the first cut ES, the felling cut as the further second cut WZS in FIGS. 2 and 3 should start relatively higher up the tree 100 or its trunk 101 than originally planned by the forestry worker 90. In this way, the hinge width and the hinge step can form a hinge which can hold the tree 100 during felling work and safely guide the said tree 100 during felling.

In the exemplary embodiment shown, the precalculation device 30 is configured to detect from the identified part EST of the course ESV of the first cut ES, in particular by means of data processing, its cut type, in this case kerf lower cut. In alternative exemplary embodiments, the system can be configured for the forestry worker to be able to communicate or select which type of cut is, in particular currently, being executed. Furthermore, the precalculation device 30 knows the sequence of cuttings in the exemplary embodiment shown. Therefore, the precalculation device 30 knows that the kerf lower cut as the first cut ES is followed by the kerf upper cut ZS as the second cut. In alternative exemplary embodiments, this can also be communicated or selected. In addition, the precalculation device knows that the kerf upper cut as the second cut ZS is followed by the felling cut as the further second cut WZS.

Specifically, the cutting information Info for executing the second cut ZS includes: the at least one part ZSIT of the ideal course ZSIV of the second cut ZS and an ideal position IPO and an ideal orientation IOR of the cutting apparatus 50 executing the second cut ZS based on the at least one precalculated part ZSIT of the ideal course ZSIV. The ideal position IPO and the ideal orientation IOR are precalculated based on the at least one precalculated part ZSIT of the ideal course ZSIV of the second cut ZS, in particular using the precalculation device 30. In alternative exemplary embodiments, it may be sufficient when the cutting information for executing the second cut can include: either the at least one part of the ideal course of the second cut or the ideal position or the ideal orientation of the cutting apparatus executing the second cut.

In the exemplary embodiment shown, the cutting information Info specifically includes where and how execution of the second cut ZS on the tree 100 or its trunk 101 should be started. In particular, the cutting information Info is displayed in the field of view of the forestry worker 90, in particular in front of the tree 100.

Furthermore, the method comprises the steps: d) identifying at least a part ZSTT of an, in particular actual, course ZSTV of the second cut ZS during execution thereof and/or identifying the position PO and/or the orientation OR of the cutting apparatus 50 executing the second cut ZS during execution thereof; e) comparing the identified part ZSTT to the precalculated part ZSIT of the ideal course ZSIV of the second cut ZS and/or comparing the identified position PO and/or the identified orientation OR of the cutting apparatus 50 to an ideal position IPO and/or an ideal orientation IOR of the cutting apparatus 50 based on the precalculated part ZSIT of the ideal course ZSV; and f) outputting further cutting information Info' for executing the second cut ZS based on the comparison during step d).

In the shown exemplary embodiment of FIG. 3, the course ZSTV of the second cut ZS deviates downwards from the precalculated ideal course ZSIV of the second cut ZS. The further cutting information Info' includes an instruction to return to the ideal course ZSIV. In this case, an instruction to return upwards. In particular, the further cutting information Info' is projected into the field of view of the forestry worker 90, in particular by means of an upwardly pointing arrow. By returning to the ideal course ZSIV of the second cut ZS, it is possible to ensure that the tree 100 cannot sit with the kerf roof on the kerf base during felling and as a result the trunk 101 cannot rip along the longitudinal axis.

Figure 5:
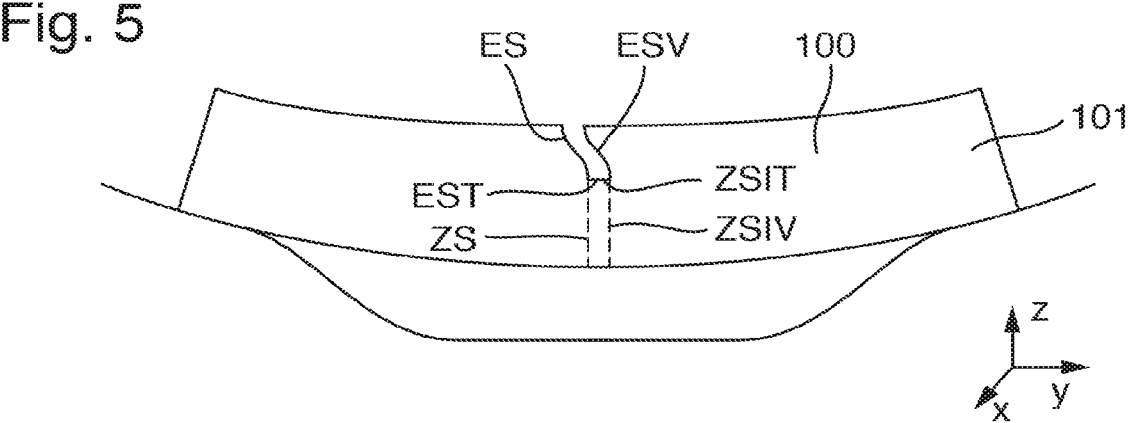
FIG. 5 is a view of a longitudinal section of a further tree which is under tension.

The exemplary embodiment of FIG. 5 shows a felled, in particular horizontal, tree 100 or a trunk 101. The tree 100 or its trunk 101 is under tension. In the exemplary embodiment of FIG. 5, a top side of the tree 100 is a pressure side and a bottom side of the tree 100 is a tension side. The first cut ES is a relief cut. The relief cut leads into the tree 100 on the pressure side. The second cut ZS is a separation cut. The separation cut should lead into the tree 100 on the tension side. The step b) includes: precalculating at least the part ZSIT of the ideal course ZSIV of the second cut ZS such that the separation cut as the second cut ZS meets the relief cut as the first cut ES.

In the exemplary embodiment shown, the relief cut as the first cut should originally run into the tree from top to bottom. However, the relief cut as the first cut ES actually runs downwards slightly to the right. Therefore, the separation cut as the second cut ZS in FIG. 5 has to start further to the right of the tree 100 than originally planned in order to meet the relief cut as the first cut ES. This allows safe severing of the tree 100 which is under tension or of its trunk 101 which is under tension.

Furthermore, the above-described method and the above-described system can also allow safe severing of branches 102, as shown in FIG. 2.

As is clear from the exemplary embodiments shown and explained above, the invention provides an advantageous method for assisting during execution of a sequence of cuttings in a tree and an advantageous system for assisting during execution of a sequence of cuttings in a tree, which method and system each improve safety during execution of the sequence of cuttings and/or make it easier to prevent undesired damage, in particular to the tree.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for assisting during execution of a sequence of cuttings in a tree, wherein, during the cutting sequence, a first cut in the tree is followed by a second cut in the tree, wherein at least a part of an ideal course of the second cut depends on at least a part of a course of the first cut, the system comprising:
   an identification device configured to identify at least the part of the course of the first cut in the tree;
   a precalculation device programmed to perform the function of:
      precalculating at least the part of the ideal course of the second cut in the tree based on the identified part of the course of the first cut; and
   an output device configured to output cutting information for executing the second cut based on the precalculated part of the ideal course of the second cut.

2. The system according to claim 1, further comprising:
   a cutting apparatus configured to execute at least one of the first cut or the second cut.

3. The system according to claim 2, wherein the cutting apparatus includes a saw.

4. The system according to claim 1, wherein the identification device comprises:
   at least one of a camera, an inertial measuring unit, a spirit level, a compass, a local position determination device, or a satellite position determination device.

5. The system according to claim 1, wherein the output device includes at least one of a display, a sound generator, or a vibration device.

6. The system according to claim 1, wherein the output device is disposed on a protective helmet, a face shield, ear protection, safety goggles, a protective glove, a smartwatch, an armband, a wristband, or a bracelet.

7. The system according to claim 1, wherein the identification device comprises:
   a stereo camera.

8. The system according to claim 1, wherein the identification device comprises:
   a time-of-flight 3D camera.

9. The system of claim 1, wherein the cutting information comprises an instruction superimposed or projected into a field of view of a user.

10. The system of claim 1, wherein the output device is further configured to:
   project the cutting information onto the tree.

11. The system of claim 1, wherein the identification device is further configured to:
   identify position coordinates and/or orientation angles of the first cut in the tree.

12. The system of claim 1, wherein the identification device is further configured to:
   identify a geometric property of the tree, in particular a diameter of the tree, wherein the part of the ideal course of the second cut is precalculated as a function of the identified geometric property, in particular diameter, of the tree.

13. The system of claim 1, wherein the precalculation device is further programmed to perform the function of:
   precalculating the part of the ideal course of the second cut in terms of a horizontal offset and a vertical offset from the part of the course of the first cut in the tree.

14. The system of claim 1, wherein the precalculation device is further programmed to perform the function of:
   receiving a selection from a user that indicates a type of the first cut in the tree, wherein
      the precalculation of the part of the ideal course of the second cut is further based on the selection.

* * * * *